United States Patent [19]

Tierman

[11] 4,302,301
[45] Nov. 24, 1981

[54] SOLID ELECTROLYTE DEPOSITION ON ANODIZED PELLETS

[75] Inventor: Melvin Tierman, North Adams, Mass.

[73] Assignee: Sprague Electric Company, North Adams, Mass.

[21] Appl. No.: 164,649

[22] Filed: Jun. 30, 1980

[51] Int. Cl.³ ............................................. H01G 9/24
[52] U.S. Cl. .................................. 204/38 A; 29/570; 427/80; 361/433
[58] Field of Search ............ 204/38 A, 37 R; 427/80, 427/226, 419 B, 419.3; 428/469, 539, 699, 702; 29/570; 361/433, 322

[56] References Cited

U.S. PATENT DOCUMENTS 4,105,513 8/1978 Nishino et al. ................... 204/38 A
4,148,131 4/1979 Nishino et al. ........................ 29/570

OTHER PUBLICATIONS

Kirk-Othmer, Encyclopedia of Chemical Technology, Interscience Publishers, vol. 19 (2nd Edition) pp. 507–514.

Primary Examiner—Delbert E. Gantz
Assistant Examiner—William Leader
Attorney, Agent, or Firm—Connolly and Hutz

[57] ABSTRACT

A porous anode valve-metal pellet is anodized, impregnated with a manganese nitrate solution containing a surfactant, and subjected to pyrolysis to convert the manganese nitrate to manganese dioxide. The surfactant reduces ridging of the manganese dioxide during pyrolysis.

8 Claims, 2 Drawing Figures

SOLID ELECTROLYTE DEPOSITION ON ANODIZED PELLETS

BACKGROUND OF THE INVENTION

This invention relates to the manufacture of a solid electrolytic capacitor, and more particularly to the use of a manganese nitrate impregnating solution containing a surfactant to reduce ridging of the manganese dioxide formed during subsequent pyrolysis.

The prior art has described the problems in obtaining even coatings of manganese dioxide on anodized valve-metal pellet anodes. One problem has been the degradation of the anodic oxide during repeated pyrolyses. In order to reduce the number of repetitions of the impregnation-pyrolysis sequence, thickeners or other means of increasing the viscosity of the manganese nitrate solutions have been employed. Another problem has been that ridges of manganese dioxide develop along the edges of the pellets during the pyrolytic conversion of manganese nitrate to the dioxide. Formation of these ridges cause two problems: thicker than desirable manganese dioxide coatings along the edges of the pellets, and thinner coatings elsewhere on the pellet surfaces. The problem is particularly acute when the pellets are rectangular.

SUMMARY OF THE INVENTION

A feature of this invention is the reduction in ridging of manganese dioxide during pyrolysis of impregnated anodized valve-metal pellets.

Another feature of this invention is the formation of more uniform manganese dioxide coatings on the pellets.

These features are accomplished by the use of a surfactant in the manganese nitrate impregnant solution used to impregnate anodized porous valve-metal pellets. The nitrate is subsequently converted to the dioxide by pyrolysis. Finally, a cathode layer is placed upon the manganese dioxide layer.

DESCRIPTION OF THE PREFERRED EMBODIMENTS

Figure 1:
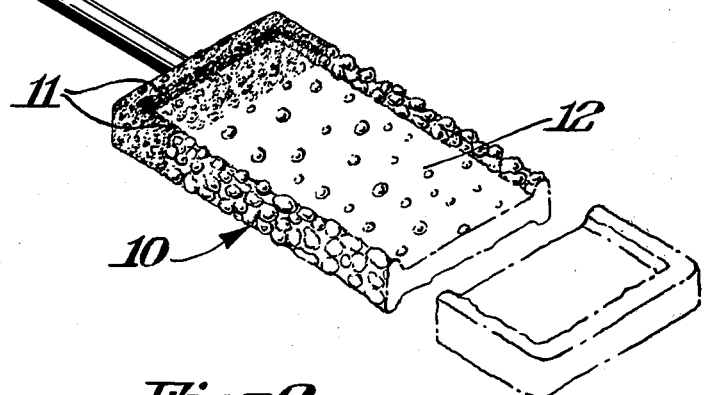
FIG. 1 is a view of a prior art anodized rectangular pellet.
Figure 2:
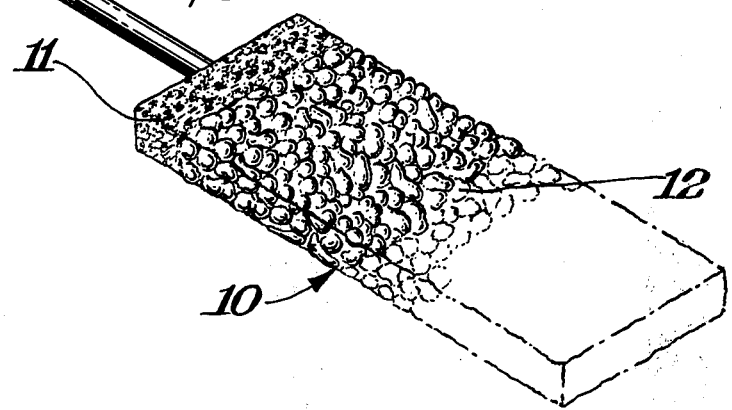
FIG. 2 shows a rectangular pellet manufactured by the process of the present invention.

Valve-metal pellets 10, preferably tantalum pellets, are anodized and then impregnated with a manganese nitrate solution containing a surfactant. The impregnated pellets are subjected to pyrolysis. FIG. 1 shows the build up of manganese dioxide ridges 11 along the pellet edges and corners when a surfactant was not used. Use of a surfactant reduced these ridges, particularly acute with rectangular pellets, and the overall coating was much more uniform. A cathode layer 12 completes the assembly.

The surfactants were evaluated at approximately 100 ppm concentration. In later tests, the concentrations were reduced to ascertain the minimum amounts required.

The surfactants were Igepal CO-630, a nonionic nonylphenoxypoly(ethyleneoxy)ethanol available from General Aniline and Film Corp.; Triton X-100, a non-ionic isooctylphenoxypolyethoxyethanol and Triton CF-10, a non-ionic benzylether-octylphenol-ethylene oxide condensate both available from Rohm & Haas Co.; Surfynol 82 (as a 50 wt % solution in ethylene glycol), a nonionic 3,6-dimethyl-4-octyne-3,6-diol, Surfynol 104, a nonionic 2,4,7,9-tetramethyl-5-decyne-4,7-diol, and Surfynol 485, a nonionic ethoxylated 2,4,7,9-tetramethyl-5-decyne-4,7-diol available from Air Products & Chemical Co., Inc.; Zonyl FSN, a nonionic fluorosurfactant available from DuPont; Deriphat 170C, an amphoteric N-lauryl, myristyl-$\beta$-amino-propionic acid available from General Mills Chemical Co. (a Henkel company); and Darvan C, a polyelectrolyte available from R. T. Vanderbilt Co.

The preferred surfactants are Igepal CO-630, Triton X-100, Triton CF-10, and Surfynol 82. In the following examples, rectangular pellets were used, as the build up of ridges at the edges and corners is more of a problem than with cylindrical pellets.

EXAMPLE 1

In this example, average results for 25 tantalum units each of control (no surfactant) and test capacitors are presented. The concentration of the surfactant Surfynol 82 was reduced from the 100 ppm to 42 ppm. Pyrolysis conditions were 285° C., and 50 psi steam, and 4 min residence time.

TABLE 1

|  | Control | Test |
| --- | --- | --- |
| Capacitance, $\mu$F | 69.6 | 67.9 |
| Dissipation Factor, % | | |
| 120 Hz | 2.6 | 2.0 |
| 1000 Hz | 14.3 | 11.9 |
| Impedance, $\Omega$, 1MHz | 0.14 | 0.12 |

The heights of the ridges were reduced while electrical properties were unimpaired; in fact, dissipation factor and impedance were improved in the test units made with the surfactant.

EXAMPLE 2

It was found advantageous to pre-dry the impregnated pellets for 1 min at 150° C. It was also found possible to reduce the pyrolysis temperature, thus reducing thermal damage to the anodic layer. In this example, the effect of pyrolysis temperature on electrical properties (dissipation factor and impedance) was measured. The test units were made using 2 ppm Triton CF-10 in the impregnation solution.

TABLE 2

| Pyrolysis Temp. | Control Units | | | Test Units | | |
| --- | --- | --- | --- | --- | --- | --- |
| | % DF 120Hz | % DF 1000Hz | Impedance 1MHz | % DF 120Hz | % DF 1000Hz | Impedance 1MHz |
| 338° C. | 2.8 | 16.0 | 0.19 | 2.1 | 12.2 | 0.13 |
| 285° C. | 2.0 | 11.2 | 0.11 | 2.1 | 12.2 | 0.12 |
| 260° C. | 1.9 | 9.9 | 0.07 | 2.0 | 10.7 | 0.09 |
| 250°0 C. | 2.1 | 11.6 | 0.08 | 2.5 | 12.9 | 0.07 |

Thus, a practical simple method of reducing the build up (ridges) of manganese dioxide at the edges of valve-metal capacitor pellets involves the use of a surfactant in the impregnation solution.

What is claimed is:

1. A process for manufacturing a solid electrolytic capacitor comprising anodizing a porous valve metal pellet to form an anodic oxide coating thereon, impregnating said anodized pellet with a solution of manganese nitrate containing a surfactant chosen from the group of nonionic, amphoteric, and polyelectrolyte surfactants, subjecting said impregnated pellet to pyrolysis to convert said manganese nitrate to manganese dioxide whereby said surfactant reduces ridging of said manganese dioxide during said pyrolysis conversion, and forming a cathode layer on said anodized pellet.

2. A process according to claim 1 wherein said pellet is dried after said anodizing and before said impregnating.

3. A process according to claim 1 wherein the sequence of impregnating and said pyrolysis is repeated prior to forming said cathode layer.

4. A process according to claim 1 wherein said surfactant is a nonionic surfactant.

5. A process according to claim 4 wherein said nonionic surfactant is chosen from the group of nonylphenoxypoly(ethyleneoxy)ethanol, isooctylphenoxypolyethoxy ethanol, benzylether-octylphenol-ethylene oxide condensate, and 3,6-dimethyl-4-octyne-3,6-diol.

6. A process according to claim 4 wherein said surfactant is a solution of 3,6-dimethyl-4-octyne-3,6-diol in ethylene glycol.

7. A process according to claim 1 wherein at least 2 ppm of said surfactant is used.

8. A process according to claim 1 wherein said valve-metal is tantalum.

* * * * *